Sakurai et al.

[11] 3,740,119
[45] June 19, 1973

[54] OPTICAL LENTICULAR GRID FOR DISPLAY APPARATUS

[75] Inventors: Tooshi Sakurai; Satoshi Tada; Kazuo Kazama, all of Tokyo, Japan

[73] Assignee: Sansui Electric Co., Ltd, Suginami-ku, Tokyo, Japan

[22] Filed: Mar. 16, 1971

[21] Appl. No.: 124,785

[30] Foreign Application Priority Data
Mar. 17, 1970 Japan.............................. 45/22463
Apr. 2, 1970 Japan.............................. 45/31725

[52] U.S. Cl. .............. 350/167, 350/241, 350/286, 353/30
[51] Int. Cl. ........................................... G02b 27/00
[58] Field of Search ................. 350/167, 188, 190, 350/204, 213, 286, 259

[56] References Cited
UNITED STATES PATENTS
1,886,445  11/1932  Delano.............................. 350/259
1,922,932  8/1933   Delano.............................. 350/259
2,182,993  12/1939  Moreno............................ 350/167 UX
2,605,434  7/1952   Homrighous..................... 350/167 X
3,004,470  10/1961  Ruhle................................ 350/212 X Primary Examiner—John K. Corbin
Attorney—Carothers and Carothers

[57] ABSTRACT

An optical grid of a plurality of optically elongated or circular lenses formed in juxtaposed parallel or concentric relation, respectively, with each of said lenses having a characteristic arcuate contour of polygonal shaped cross-section which is symmetrical on either side of a line passing through the center of the lens. The optical grid is employed in a display apparatus having a guide frame with a movable frame reciprocative in the guide frame. A projecting screen is provided on the front face of the guide frame behind which, in spaced relation, is positioned the optical grid. The front face of the movable frame is provided with an artwork grid, the subject matter of which is displayed on the projecting screen through the optical grid. Illuminating means for the artwork grid are located on the rear face of the movable frame.

10 Claims, 6 Drawing Figures

PATENTED JUN 19 1973

INVENTORS.
TOOSHI SAKURAI,
SATOSHI TADA &
KAZUO KAZAMA

BY CAROTHERS & CAROTHERS
THEIR ATTORNEYS

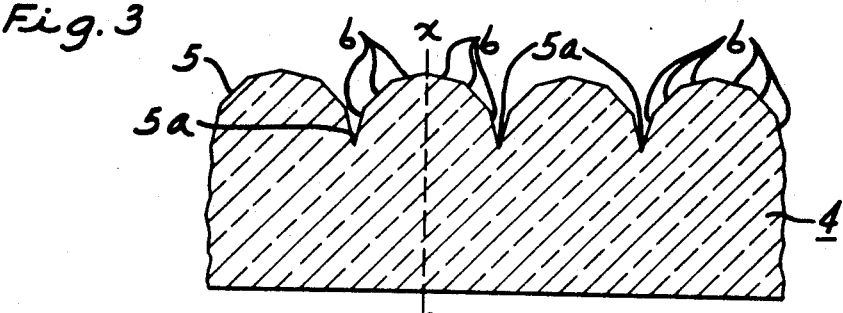
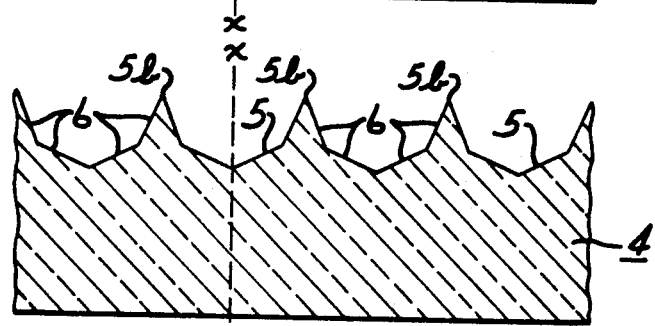
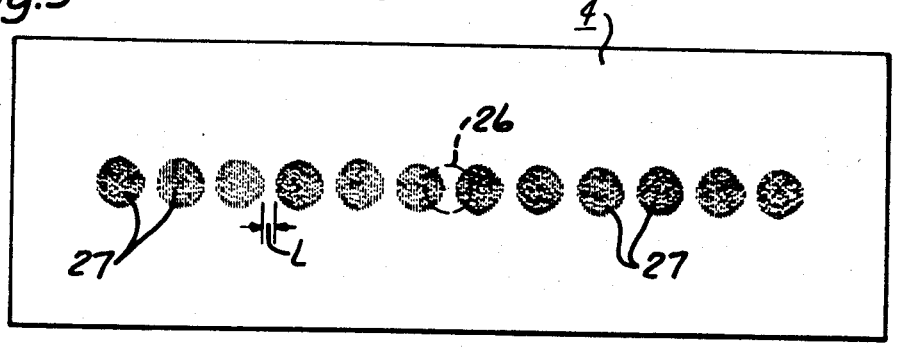
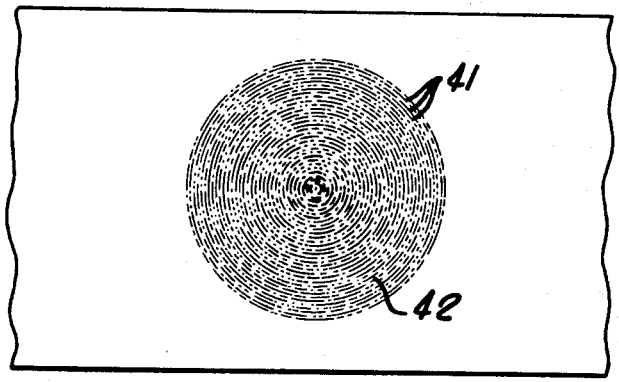

OPTICAL LENTICULAR GRID FOR DISPLAY APPARATUS

BACKGROUND OF THE INVENTION

This invention relates generally to optical systems and optical elements used in connection therewith and more particularly to a refractive lens system for the display of artwork, the subject which may be letters, marks, figures, etc., in a pattern grid by projecting light through the pattern grid to display the same on a rear surface screen. An optical grid is interposed between the artwork grid and the projecting screen to make it possible to enlarge or reduce the images in the pattern. Thus, the principal concept in the apparatuses in the class of the present invention is to employ a prism device or optical grid to display the images of subjects on an artwork grid in a separated or spaced relation on a projecting screen, whether a front or rear projection screen. The problem frequently encountered with such projection is where an optical lens is used in order to enlarge each of a series of subjects on the artwork grid on a projection screen and as a result each of the images of each of the subjects, due to such enlargement, projected on the screen would overlap on one another and as a whole become diffused with one another losing their separate distinctiveness confusing the observer as to the meaning of the displayed pattern.

In the display of separated images on a projection screen, the degree of separation of the images is dependent upon the distance between the subject on the artwork grid and the optical grid. The separation of the images on the screen may be increased by moving the optical grid away from the artwork grid. The artwork grid is, thus, illuminated from behind so that the subject matter or pattern on this grid is projected through the optical grid to, for example, a rear projection screen where the distance of separation between the various images representing the subject or pattern as projected on the screen can be enlarged or reduced by varying the relative distance between the artwork grid and the optical grid. Such display apparatus has been found to have utility in a stereophonic sound reproducing system wherein the apparatus can be variably adjusted, that is, the size and distance of separation of the visual images on the projection screen can be varied in accordance with the intensity, tempo, etc. of the stereophonic sounds or in accordance with the amount of reverberation of sounds as reproduced from the sound generating sections of the left and right amplifier units of the stereophonic sound reproducing system.

In using such display apparatus of the prior art in conjunction with such sound systems, it can readily be seen that the loss of distinctiveness in a pattern of subject on an artwork grid due to diffusion of images on the projection screen renders the display of such a pattern meaningless or nonunderstandable to the ordinary observer listening to and possibly attempting to interpret the relationship of the stereophonic sounds to the display on the screen.

Also the display apparatus of the prior art are quite large and therefore difficult to assemble and the individual components, such as, the artwork grid, optical grid and the light source, and use as a component in a stereophonic sound system. The display apparatus of the present invention is directed toward a compact unit convenient to use and commensurate in size with the stereophonic sound reproducing systems.

SUMMARY OF THE INVENTION

The present invention relates to the employment of an optical grid in display apparatus which overcomes the above mentioned disadvantage of image diffusion or overlapping when the size of the images are increased on the projection screen. The optical grid comprises what might be termed as a series of prism elements or more preferably a plurality of optical lenses formed in juxtaposed relation. The grid may be transparent or semitransparent. Each lens making up the entire grid has a characteristic contour which may be defined as a polygonal arcuate cross-sectional contour. Thus, each lens has a uniform polygonal surface, the contour of which is symmetrical relative to the central plane or line passing longitudinally through the lens so that each half of a lens is a mirror image of the other half of the lens. Due to this symmetricity, a subject projected through the optical grid is split into a number of images on the projection screen, which number of images is equal to the number of polygon faces making up each lens. The separation between the split images on the projection screen can be changed by varying the distance between the optical grid and the artwork grid while distinctly displaying the pattern in a three-dimensional manner.

The lenses making up the optical grid may be elongated and in juxtaposed parallel relation or may be composed of a plurality of concentric circles.

Also the arcuate form of the polygonal lenses making up the grid may each be plano-convex or plano-concave in contour arrangement.

Another feature of the present invention is a display apparatus having a movable frame, the forward end of which supports the artwork grid bearing the subject pattern with means for illumination supported in the movable frame behind the artwork grid. The movable frame is adapted for reciprocative movement in a guide frame so that the artwork grid can be selectively positioned relative to the optical grid supported on the forward end of the guide frame. The movable frame is connected for back and forth motion in the guide frame by means of a double draw line connected to an adjusting mechanism.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 3 is an enlarged cross-sectional view of a portion of the optical grid of FIG. 2 having a plano-convex type contour.

FIG. 4 is an enlarged cross-sectional view of a portion of a modified form of the optical grid having a plano-concave type contour.

FIG. 5 is another front elevation of the optical grid of FIG. 2 showing images being transmitted through the grid from the artwork grid.

FIG. 6 is a front elevation of another embodiment of an optical grid that can be used in association with the display apparatus of FIG. 1.

Figure 1:
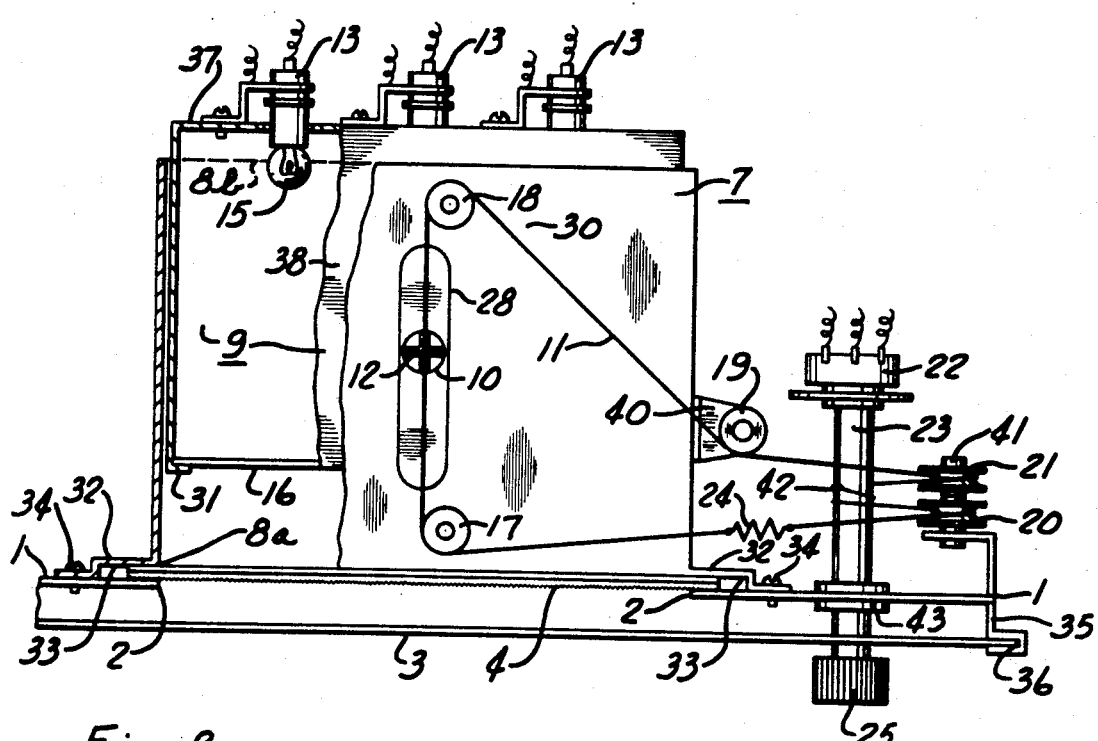
FIG. 1 is a plan view of the display apparatus employing the optical grid comprising this invention.

Referring now particularly to FIG. 1, the display apparatus generally consists of a box-like unit with the basic housing being the guide frame 7 with open front and rearward ends 8a and 8b, respectively. A flange 32 is provided around the front end 8a and is provided with a shoulder 33 to receive the optical grid 4. The optical grid 4 is secured in place by means of the front panel frame plate 1 which is attached to the flange 32 by means of the screws 34.

The front frame plate 1 is provided with an opening 2 so that the optical grid 4 is held in fixed relation on the front of the guide frame 7 along the periphery of the opening 2 of the frame plate 1.

The front frame plate 1 is provided with extension support members 35, one of which is shown in FIG. 1, which are provided with slots 36 to receive in fixed relation the semitransparent projection screen 3. The projection screen 3 can, for example, be referred to as a "smoked plate" and may be molded of acryl resin having a light transmissibility of the order of 30 to 40 percent.

Figure 2:
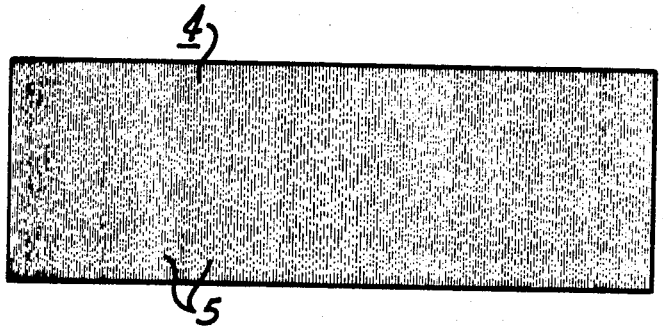
FIG. 2 is a front elevation of the optical grid comprising this invention.

The optical grid or prism plate 4 may be formed of a transparent or semitransparent rectangular thin plate made of glass or synthetic resin. As shown in FIGS. 2 and 3, the optical grid 4, in essence, comprises a plurality of optically elongated lenses 5 formed in juxtaposed parallel relation. The surface of the lenses 5 is shown in detail in FIG. 4 and consists of polygonal arcuate cross-sectional contour made up of a series of polygonal surfaces or sides 6 which are symmetrical relative to a central longitudinal plane indicated by the dotted line $x$—$x$ passing through a lens 5 of FIG. 3. Thus, one-half of a lens 5 is a "mirror image" of its other half as measured from the plane $x$—$x$. The type of lens contour of the optical grid of FIG. 3 can be characterized as plano-convex.

As shown in FIG. 3, each lens 5 in the example shown, has six polygonal sides or surfaces, each surface or side being indicated at 6. Each lens 5 is incorporated between any pair of adjacent recesses 5a which form the end points of each lens 5.

FIG. 4 shows a modified form of the optical grid 4 wherein the general contour of the lens is plano-concave. The lenses 5 are recessed and are found between adjacent pairs of ridges 5b which form the end points of each lens 5. Each concave shaped lens 5 has a plurality of optically elongated surfaces or sides 6 which form a polygonal arcuate cross-sectional contour indicated in FIG. 4.

Referring again to FIG. 1, the top wall 30 of the guide frame 7 is provided with an elongated guide opening 28 position so that its longest extent is toward the guide frame open ends 8a and 8b.

A movable frame 9 which is box-shape is provided to be slidably mounted in the guide frame 7. The permitted movement of frame 9 is in a forward and rearward direction relative to the open ends 8a and 8b. The front end of the movable frame 9 is open and is provided with the peripheral shoulder 31 to receive the artwork grid 16 which is provided with an overlay or mounted pattern or subject with transparent portions for the purpose of being projected through the optical grid 4 onto the rear projection screen 3.

The back wall 37 of the movable frame 9 is provided with a plurality of illuminating lamp sockets 13 within which are mounted the lamps 15 for illuminating the artwork grid 16 and, thus, project the subject on the artwork grid to the projection screen 3 to appear as images thereon.

From the foregoing, it can be seen that the movable frame 9 may be a completely enclosed container, and is slidably mounted in any convenient manner, such as, on antifrictional bearings within the guide frame 7. Since the size of the display apparatus is quite small, frictional encounter does not become a serious problem.

The artwork grid 16 as used herein is to mean any subject that is made to be placed on the grid and projected on the screen 3 through the split image optical grid 4. The artwork can take any form, such as, letters, marks numbers, designs, symbols, etc., the pattern of which may consist of colored transparent portions making up such letters, marks, figures, etc.

Referring again to the movable frame 9, the protrusion or arm 10 is secured to the top wall 38 of the frame 9 and is adapted to protrude through the elongated guide opening 28 of the guide frame 7. A cross-shaped notch 12 is provided in the top of the arm 10 to which is secured the draw line 11. As can be seen in FIG. 1, the closed loop draw line 11 passes around the two vertically mounted pulleys 17 and 18 which are rotatably mounted on the top wall 30 in aligned relation with the elongated slot or guide opening 28. The draw line 11 after passing around pulley 18, is thence passed around vertically mounted pulley 17 which is rotatably mounted on the support 40 secured to the side of the guide frame 7. Thus, the draw line 11 is directed by pulleys 17 and 19 toward the right side of the guide frame 7 where it is passed, respectively, over the horizontally mounted pulleys 20 and 21. The rotatably mounted pulleys 20 and 21 are supported on the shaft 41 which is supported from the support member 35. The draw line 11, passing over the pulleys 20 and 21, is then wrapped around the rotary shaft 23 as shown at 42 so that rotation of the shaft 23 will rotate the line 11 by rapping and unrapping the line from the shaft upon rotation of the knob 25.

It should be noted that the draw line 11 is an endless loop and the ends are connected together by the tensioning spring 24 which takes up any slack that develops in line 11 to insure that the rotary shaft 23 properly grips the line 11 upon rotation of the shaft 23 in either direction by means of the knob 25. The shaft 23 is rotatably supported in the bearing 43 supported in the front frame plate 1. Thus, when rotating knob 25, the moving frame 9 can be caused to be moved rearwardly or forwardly in guide frame 7 so that the artwork grid 16 can be adjusted in relation to the optical grid 4 and vary the distance between the artwork grid 16 and the optical grid 4 and also vary the effective size of the images recreated on the projection screen 3. The nature of the optical grid 4 is such that the images reproduced on the screen 3 will not overlap or become diffused even upon increase of their size on that screen.

The adjusting means 22 is secured to the end of the shaft 23 opposite to that end on which knob 25 is located. Adjusting means 22 is an example of the type of application to which the display apparatus might be applied to in a sound reproducing system. The adjusting means 22 may be therefore a regulator of the amount of reverberation, for example, a volume control potentiometer.

In FIG. 5, there is illustrated the optical grid 4 upon which a series of images are produced after being transmitted thereto through the light transparent portion 26 shown in dotted line in FIG. 5, forming the subject overlay on the artwork grid 16. The images can be seen on the projection screen after being transmitted through the optical grid 4 so that the degree of adjustment of the adjusting means 22 can be optically displayed to an observer viewing the screen 3. This optical display is such that if the distance between the optical grid 4 and the artwork grid 16 is increased, the gap or space "L" between the projected images 27 is also varied. The images 27 produced from the subject 26 are displayed through the optical grid in a split fashion equal to the number of surfaces or sides 6 of each of the lenses 5, the gap or spaces "L" between the respective split images 27 enlarged or reduced in accordance with the ratio of adjustment made through knob 25.

Reference is made to FIG. 6 showing a modified form of the optical grid 42 which consists of a series of optically circular lenses 41 formed in concentric side-by-side relation giving the appearance of a large "bulls eye" target. The contour and configuration of the lenses 41 is the same as that shown in FIG. 3 wherein each circular lens 41 is provided with a polygonal arcuate cross-sectional contour symmetrical relative to a centrally located hollow imaginary cylinder passing through the central point of each lens 41. Thus, each half of a lens 41 is a mirror image of its other half. If a subject from the artwork grid 16 is viewed by an observer from a transverse direction through the circular concentrically formed optical grid 42, the images of the displayed subject are seen three-dimensionally and may also be displayed in an enlarged or reduced scale as the distance between artwork grid 16 and the optical grid 4 is varied. The greater the distance between these grids, the larger the images produced on the screen 3 but always separated by a gap or space "L".

With respect to the optical grid 4 shown in FIGS. 2 and 4 wherein the lens 5 in juxtaposed parallel relation, each having a series of angularly disposed faces 6, the images 27 produced through the optical grid 4 to the semitransparent projection screen 3 are displayed lineally with respect to subject 26 of the artwork grid 16 as indicated in FIG. 5, each of the images being formed in a straight line and equally spaced from each other. In the case of the embodiment shown in FIG. 6, wherein the subject 26 is projected to the central area of the concentric circular grid 42, one image will be displayed in the center of the grid while the other images will be arranged symmetrically around the central image.

In order to give some idea of the dimensional size of the optical grid 4, the plate thickness of the grid may be 1 mm. while each lens 5 may have a height of 0.225 mm. and a width of 0.45 mm.

According to the present invention, an optical display apparatus is provided to have a movable frame upon which there is supported an artwork grid on the front end thereof and lamps provided at the rear of the movable frame in order to illuminate the subject or pattern provided on the grid. The movable frame is slidably mounted in a guide frame, the front end of which is provided with a panel frame plate which supports an optical grid, which in the preferred form, comprises a series of elongated lenses formed in juxtaposed parallel relation, each of these lenses having a polygonal arcuate cross-section contour symmetrical relative to a central longitudinal plane to each of the lenses. In front of the optical grid there is supported a rear projection screen to receive the resultant projected images through the optical grid from the artwork grid. Because of the nature of the optical grid, the images produced on the projection screen are displayed in a multiple manner, the multiplicity of which corresponds to the number of surfaces or edges of the polygonal cross-sectional lens, with each of the images being displayed in independent form. The images may be enlarged or reduced by varying the distance between the artwork grid and the optical grid by moving the movable frame within the guide frame. The gap or space is formed between each of the projected images on the projection screen is dependent on their ratio of the distance between the artwork grid and the optical grid so that the identification of the degree of adjustment in the enlargement or reduction of the size of the image may be varied without causing the images to become diffused with one another or projected in an overlapping relationship or separated by a distance greatly disportional to the relative sizes of the produced images. Such apparatus is especially suited for displaying the stereophonic extent or the amount of reverberation in a stereophonic sound reproducing apparatus.

We claim:

1. A split image optical grid for providing a plurality of images from a single artwork image on an artwork grid when viewed through said optical grid, said optically produced images not overlapping as the focal distance is varied between said grids, comprising a plurality of optically elongated lenses formed in juxtaposed parallel relation, each of said lenses provided with a plurality of polygonal surfaces arcuately disposed concentrically relative to a center point of equal distant from each of said polygonal surfaces, the number of said polygonal surfaces of even number and forming in degree a semicircular arrangement wherein the center point and end points of each of said lenses are within a common plane.

2. The optical grid of claim 1 characterized as being transparent.

3. The optical grid of claim 1 characterized as being semitransparent.

4. The optical grid of claim 1 characterized in that each of said polygonal arcuate lenses have a plano-convex type contour.

5. The optical grid of claim 1 characterized in that each of said polygonal arcuate lenses have a plano-concave type contour.

6. The optical grid of claim 1 characterized in that each of said lenses comprising said grid are arranged as a plurality of concentric circles.

7. The optical grid of claim 6 characterized as being transparent.

8. The optical grid of claim 6 characterized as being semitransparent.

9. The optical grid of claim 6 characterized in that each of said polygonal arcuate circular lenses have a plano-convex type contour.

10. The optical grid of claim 6 characterized in that of each of said polygonal arcuate circular lenses have a plano-concave type contour.

* * * * *